May 2, 1950 A. W. HAYDON 2,505,829
ELECTRIC MOTOR AND METHOD OF FABRICATING SAME
Filed Aug. 28, 1945 2 Sheets-Sheet 1
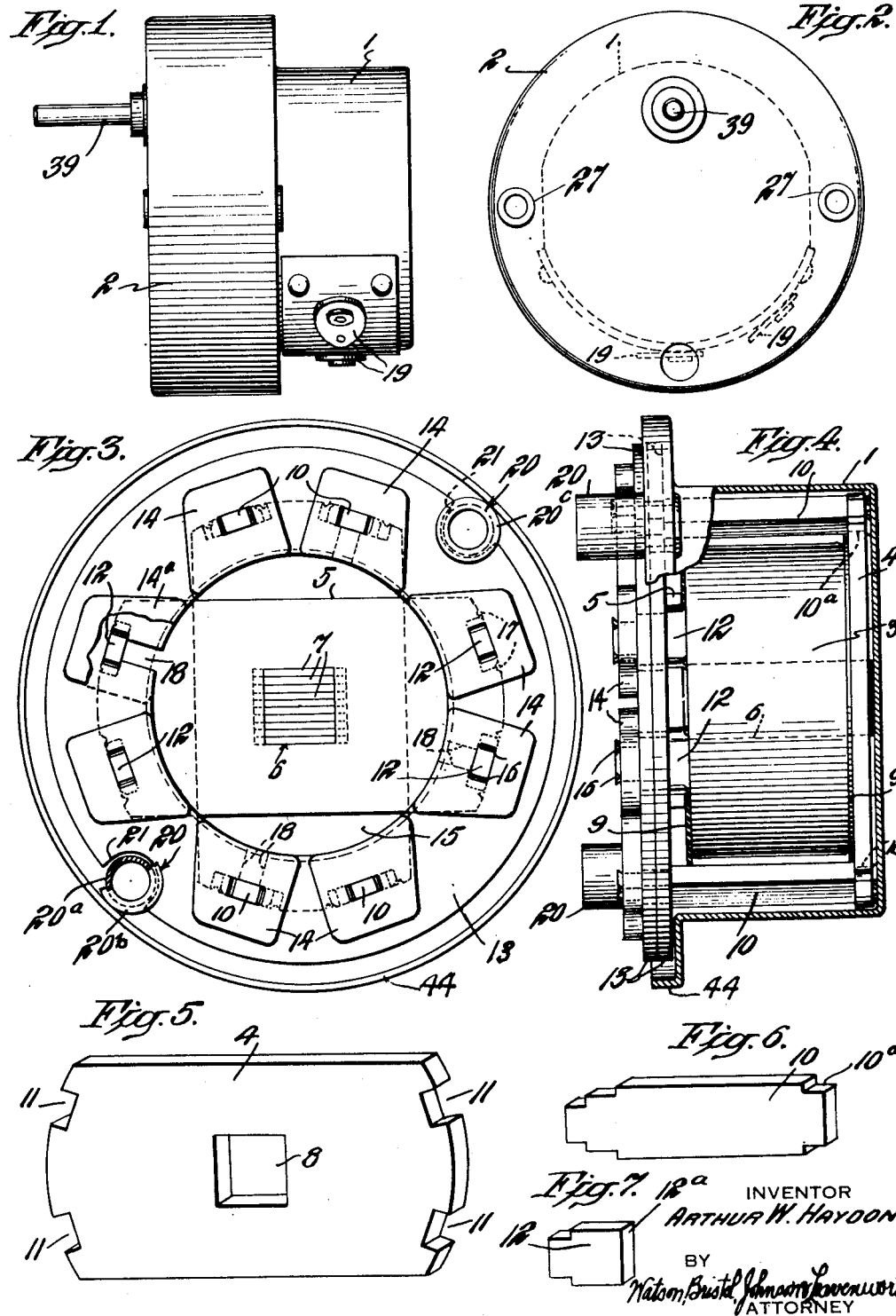

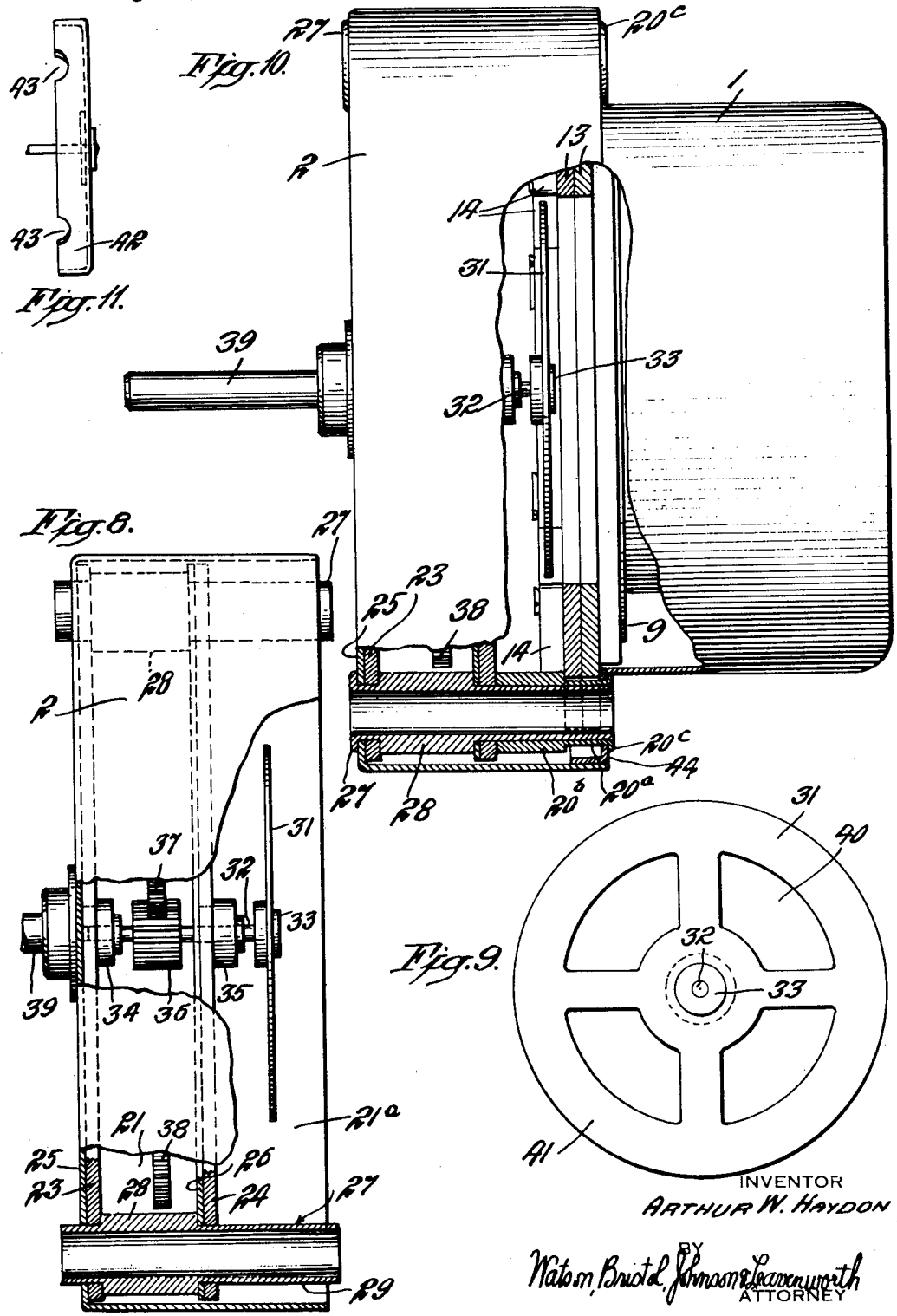

Patented May 2, 1950

2,505,829

UNITED STATES PATENT OFFICE 2,505,829

ELECTRIC MOTOR AND METHOD OF FABRICATING SAME

Arthur W. Haydon, Marion, Conn.

Application August 28, 1945, Serial No. 613,075

2 Claims. (Cl. 172—278)

The invention is concerned with a construction and method of fabricating an electric motor unit of the small synchronous alternating current type adapted to be employed, for example, in a clock or other timing means.

It involves a relation of members whereby the motor may be initially formed as two complete self-contained sub-assemblies, one comprising the field unit and the other the rotor and gear unit, the two sub-assemblies then being adapted to be telescoped together and sealed to form a complete compact motor unit. Whenever any necessity arises for repair or change in either sub-assembly, it may easily be removed from the other and repaired or replaced by a different one without disturbing the use or value of such other sub-assembly.

Contributing to the achievement of these features are the characteristics of each of the two sub-assemblies. The gear and rotor part embodies an outer shell, with a portion partitioned off, in which is located the gear train mechanism in a fully enclosed chamber. A take-off shaft projects forwardly from the gear chamber and a rotor shaft projects rearwardly, carrying the rotor, suitably located for positioning in the field unit upon final assembly of the two units.

The field unit also embodies an outer shell with the elements arranged to provide the magnetic field at a forward open side. In assembling, the two shells fit together, preferably in a telescoping manner, with the rotor, although supported exclusively in the gear unit, extending into the field unit in proper relation thereto. The bearings for the rotor shaft are such as to permit axial self-adjustment of the rotor, and the air gap and space around the rotor may be made relatively large so that variations in manufacture will not materially affect the relation or performance of the motor.

The form of field unit thus provided is accomplished by a simple association of parts, all of which may consist of comparatively simple flat plate stampings which do not require any supplemental shaping. The various plate parts comprising the field unit may be assembled and secured in place by simple operations without the need of any screw parts, for example. Suitable shading rings are easily embodied in the unit and secured in place in conjunction with the method of fabrication just described, the relation and character of the shading rings being such as to permit variations in the position of the rotor without interference therewith.

The method of forming the field unit of flat plate stampings also applies in general to the gear unit so that all parts of the motor are either flat stampings or screw machine parts with exception of the two shells comprising the housing members. In general, an exceptionally compact motor is accomplished by simple and economical means and methods of fabrication.

These and various other objects of the invention will appear more fully hereinafter and the invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of which invention will be indicated in the claims.

For a fuller understanding of the nature and objects of the invention reference should be had to the following detailed description taken in connection with the accompanying drawings, in which:

Fig. 1 is a side view in elevation of a complete motor assembly embodying the principles of the invention;

Fig. 2 is a front elevation looking from the left in Fig. 1;

Fig. 3 is an elevation looking into the front of the field unit in its casing;

Fig. 4 is a side elevation looking from the right in Fig. 3, with the casing broken away;

Fig. 5 is a perspective of one of the plates comprising a side member of the field coil spool;

Fig. 6 is a perspective of one of the long flux carrying members adapted to be secured in one of the plates of Fig. 5;

Fig. 7 is a perspective of one of the short flux carrying members adapted to be secured in the other of the side members like that of Fig. 5;

Fig. 8 is a view in elevation of the gear and rotor unit with the casing and some other parts broken away;

Fig. 9 is a plan view of the rotor;

Fig. 10 is a side elevation of the complete assembly, with parts of the casing broken away and certain elements in cross-section to show the relation of various elements in the complete assembly; and Fig. 11 is a side view of a modified form of rotor.

The motor is adapted initially to be fabricated into two sub-assemblies comprising the field unit, shown generally in Figs. 3 and 4, and the gear and rotor unit, shown generally in Fig. 8. In the final assembly, these two units are secured together in the relation shown particularly in Figs. 1 and 10, the casing or shell for the field unit being indicated at 1 and that for the gear unit at 2.

The construction of the field unit will be described first. As indicated above, this unit comprises a casing part 1 into which is inserted the assembled unit shown in Figs. 3 and 4. The construction includes a spool on which is wound a coil 3 of magnet wire. The spool comprises a generally oblong flat rear plate 4 of the character shown in Fig. 5, and a similar front plate 5, the two plates being assembled on a suitable core 6 which preferably is of a laminated type consisting of a series of flat plates 7 of soft iron material, the ends thereof being reduced as to width for reception in an opening 8 in the respective core side plates 4 and 5 and provide a shoulder against which the side plates bear to determine their spaced relation. Suitable insulating disks 9 are located at the opposite sides of the coil 3.

As shown in Figs. 3 and 4, the core plates 4 and 5 are located in spaced parallel planes but with the longer dimensions of the plates at right angles to each other. Extending forwardly from and at right angles to the rear plate 4 are a series of long flux carrying members 10 like that shown in perspective in Fig. 6. In the construction shown, there are two of these located at each end of the plate 4. The inner ends of the members 10 are reduced in width, providing a tongue-like part 10a adapted to fit into one of the notches 11 in the ends of the plate 4.

Extending forwardly from the front core plate 5 are a series of short flux carrying members 12, like that of Fig. 7, the rear end 12a of which is adapted to be received in a notch of the front plate 5 similar to the notch 11 shown in the plate 4 of Fig. 5.

Assembled over the projecting ends of the respective flux carrying members 10 and 12 are one or more shading rings 13, two being shown, the rings having suitable openings through which extend the ends of the flux carrying members. Beyond or outside of the shading rings 13, each of the flux carrying members 10 and 12 has assembled thereon a pole tip 14 comprising a small flat plate-like member of the character shown in Figs. 3 and 4, the pole tips extending radially inwardly and each having an arc-shaped inward edge, the inward edges together defining a circular opening 15 adapted to receive therein a rotor as will be further described. The shadings rings 13 likewise have circular openings of a preferably similar character and diameter corresponding to opening 15, into which the rotor or parts thereof may extend. It will be noted that the core plates 4 and 5 of the spool, the flux carrying members 10 and 12, the shading rings 13, and the pole tips 14 each comprise individually plate-like elements which may be economically made by stamping operations and then assembled in the simple manner illustrated. This likewise applies to the core structure 6, when made of laminated plates as shown. The character and relation of the individual elements provide not only a simple and economical means of initially making the parts but also of assembling them into a rigid unit as by welding, peening or staking. The particular method illustrated is what is often referred to as "staking," comprising here an operation which may be performed by a chisel to notch and spread protruding or adjoining parts. As indicated e. g. at 16 in Figs. 3 and 4, such chisel marks are applied to the ends of the flux carrying members 10 and 12 where they protrude slightly beyond the pole tips 14. Similar indentations may be made at 17 in the adjoining core plate 5. The core laminations 7 may be similarly treated to secure the spool parts together. It will be observed that the pole tips 14 secured in the manner disclosed not only serve their purpose as magnetic poles for the rotor field but also provide means securing the shading rings 13 between the pole tips 14 and the adjoining core plate 5.

The shading rings 13 function in the manner well known in motors of this character, to effect self-starting of the motor, that is, one of each pair of poles is shaded by providing a conductive path therearound. In Fig. 3, one of the pole tips 14a has been partially broken away to illustrate better the construction of the shading rings. It will be noted that adjoining the opening for one of the flux carrying members of each pair, the shading rings are each provided with coinciding cut-out slots 18 to interrupt the conductive path around the particular flux carrying element. The shading rings will, of course, be made of suitable conducting material, such as copper.

The assembly just described contains no bearings nor moving parts, and may be dipped in varnish and baked to assure good insulation, and the penetration of the varnish into crevices aids in maintaining the rigidity and prevents noise from vibration. After so treating it, the assembly may be slid into the shell 1 in the position shown in Fig. 4 presenting the magnetic field for the rotor at the open side. The shell has suitably located openings over which are located terminals 19 for the coil.

The field unit is secured in its casing 1 by a plurality of angularly spaced bushings 20, two such being employed here, spaced 180° apart. A cross-section of one of these bushings appears in Fig. 10. Each of these has a diametrically reduced portion 20a adapted to be received in notched portions 21 of the shading rings 13, the bushing being broken away in the lower part of Fig. 3, to show this more clearly. The reduced portion 20a of the bushing also extends through an opening provided in the casing 1 and is rolled over or staked at the end, as shown in Figs. 4 and 10, at 20c, whereby the field unit is secured in its casing. The enlarged portion 20b of the bushings, in addition to providing a shoulder engaging against the outer shading ring, also serves as a spacer, as will be later described more fully in connection with Fig. 10.

The gear and rotor unit is shown particularly in Fig. 8, and comprises a casing or shell part 2 having a closed portion 21 and an open inner end portion 21a. The closed portion 21 includes two parallel circular plates 23 and 24 separated by pillars and supporting the ends of suitable studs for the gear train located in the chamber 21. The details of the gear train for the most part are not important to the present invention and may vary in construction and arrangement, and accordingly only so much thereof is illustrated and described as is necessary to an understanding of the features of the invention. The chamber 21 is adapted to have lubricant enclosed therein and supplied to the various bearings for the gears and gear studs by capillary action between the plate 23 and the forward wall 25 of the housing and between the bearing plate 24 and a thin plate 26 positioned adjacent thereto. The spacing and angular relation of the bearing plates are determined particularly by suitable bushings, two such indicated at 27, spaced 180° apart, being shown. The bushings have a body portion 28 forming shoulders against which the respective plates are positioned and a reduced sleeve portion 29, the purposes of which will be described more in detail in connection with the complete assembly of Fig. 10.

The general arrangement is such as to enable the use of varied types of rotors, either of the continuous ring or disk type or the squirred cage type. The rotor selected will vary in accordance with the particular characteristics desired. Figs. 9 and 10 show a flat plate-like rotor 31 secured, as appears in Fig. 10, on a shaft 32 by means of a suitable bushing 33. The shaft is provided with bearings 34 and 35 in the respective plates 23 and 24. A single rotor disk is shown, but it will be understood that a plurality of disks may be employed either in laminated form or axially spaced. Also secured on shaft 32 is the initial drive pinion 36, the pinion and its shaft being free to shift axially for self-adjustment thereof. In this connection, it is noted that the pinion 36 is of considerable width and remains in meshing relation with the next gear 37 in the drive train regardless of the axial position of the rotor and its shaft and pinion. As noted above, the casing portion 21 includes further suitable gears, a fragment of one such gear being shown at 38, the gear train eventually driving the take-off shaft 39 rotating at a suitably reduced speed for the purpose designed. For example, in the present case, the rotor operates at 1800 R. P. M. and the shaft 39 at 1 R. P. M.

The rotor is of the hysteresis type, and in the form of Figs. 9 and 10, comprises a disk having cut-out portions 40 providing a non-uniform magnetic reluctance. The continuous ring armature portion 41 at least is composed of hardened steel having a high hysteresis coefficient. As heretofore noted, the character of the rotor may vary considerably, the particular form of Figs. 9 and 10 having the advantage of being capable of manufacture as a flat plate stamping like many other parts of the general assembly. Another illustrative form which may be employed, however, is shown in Fig. 11 comprising a cup-shaped member 42 which may have the outer flange part interrupted by suitable notches or cut-out areas 43.

There has thus far been described a field assembly unit as shown in Figs. 3 and 4, and a rotor and gear unit shown particularly in Fig. 8. These two units in the process of fabrication of the complete motor are then assembled together in the relation shown particularly in Fig. 10, the enlarged flange portion 44 of the field casing part 2 telescoping into the open end 21a of the gear unit. The bushings 20 and 27 comprise locating means, the reduced portion 29 of the bushing 27 sliding into the opening in bushing 20. The enlarged portions 20b of the bushings 20 also provide shoulders against which the inner surface of plate 24 bears and which determine therefor the axial spacing of the two units. The sleeve portion 29 of the gear unit bushing 27 may, if desired, be made of sufficient length to extend completely through and slightly beyond the previously rolled down end of the bushing 20, in which case the projecting end of sleeve 29 is in turn rolled down or staked as shown at the bottom portion of Fig. 10 to secure the two units in assembled condition. The central opening of the bushing 27 provides means for the application therein of bolt or screw means for assembling the complete unit on any desired frame structure, such as a clock frame. Such bolts or screws may also be relied upon to hold the two units together instead of rolling down the end of sleeve 29.

As will be observed from Fig. 10, in the assembled relation, the rotor 31 occupies a position in substantially the central plane of the pole tips 14 but is free automatically to adjust itself axially. In this connection, it will be noted that ample space and clearance are provided and other types of rotors having thicker dimensions, such as that of Fig. 11, may readily be accommodated. This results from the construction, including particularly the relation of the pole tips and the shading rings, with the openings in the shading rings corresponding to that of the opening 15 around which are arranged the pole tips. The complemental shell parts 1 and 2 combine to result in a fully enclosed motor assembly.

Since certain changes in carrying out the above method and in the constructions set forth, which embody the invention, may be made without departing from its scope, it is intended that all matter contained in the above description or shown in the accompanying drawings shall be interpreted as illustrative and not in a limiting sense.

Having described my invention, what I claim as new and desire to secure by Letters Patent is:

1. An electric motor having in combination two casing parts each with one open side adapted when assembled together at the open sides to form a complete housing for said motor, a first one of said casing parts containing a field unit comprising a wound core between spaced magnetizable plates with the axis extending outwardly through the casing opening, said plates each having pole pieces extending outwardly to establish a magnetic field in a plane located at said open side and forming a central opening to receive therein a rotor, the other of said casing parts containing a gear train assembly and a rotor supported exclusively in said gear assembly casing and adapted in assembling said motor to be moved freely into said field pole opening.

2. An electric motor having in combination a field assembly and a gear assembly, said assemblies each being formed as an independently assembled self-contained unit, said field assembly comprising a pair of spaced magnetizable plates with a core having a coil wound thereon between said plates, a shading ring means arranged in a plane adjacent the exterior surface of one of said plates, flux carrying members extending from each of said plates through openings in said shading ring means and provided with pole pieces arranged to form an opening in a plane adjacent said shading ring means, said gear unit comprising a gear train enclosed in a casing having a rotor shaft projecting from the casing and carrying a rotor supported exclusively on said shaft in said gear unit casing, and means for detachably securing said units together with the rotor positioned in said pole piece opening.

ARTHUR W. HAYDON.

REFERENCES CITED

The following references are of record in the file of this patent:

UNITED STATES PATENTS

| Number | Name | Date |
|---|---|---|
| 1,456,082 | Warren | May 22, 1923 |
| 1,511,387 | Kaisling | Oct. 14, 1924 |
| 1,728,692 | Michl | Sept. 17, 1929 |
| 1,752,224 | Apple | Mar. 25, 1930 |
| 2,151,996 | Spahn | Mar. 28, 1939 |
| 2,237,960 | Hansen et al. | Apr. 8, 1941 |
| 2,243,063 | Arey | May 27, 1941 |
| 2,266,878 | Lux | Dec. 23, 1941 |
| 2,289,495 | Hansen | July 14, 1942 |
| 2,313,466 | Dicke | Mar. 9, 1943 |
| 2,412,461 | MacIntyre | Dec. 10, 1946 |

FOREIGN PATENTS

| Number | Country | Date |
|---|---|---|
| 150,615 | Great Britain | Sept. 9, 1920 |